(12) United States Patent
Okabe

(10) Patent No.: US 7,886,268 B2
(45) Date of Patent: Feb. 8, 2011

(54) INFORMATION PROCESSING APPARATUS AND COMPUTER PRODUCT

(75) Inventor: Kiwamu Okabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1097 days.

(21) Appl. No.: 11/346,225

(22) Filed: Feb. 3, 2006

(65) Prior Publication Data

US 2006/0225038 A1 Oct. 5, 2006

(30) Foreign Application Priority Data

Mar. 15, 2005 (JP) ............................. 2005-073326

(51) Int. Cl.
*G06F 9/44* (2006.01)
*G06F 3/00* (2006.01)
*G06F 9/46* (2006.01)
*G06F 13/00* (2006.01)
*G06F 9/24* (2006.01)
*G06F 15/177* (2006.01)

(52) U.S. Cl. ...................... 717/120; 717/130; 719/313; 713/1

(58) Field of Classification Search ................. 717/130, 717/120; 713/1; 719/313
See application file for complete search history.

(56) References Cited

U.S. PATENT DOCUMENTS

| | | | |
|---|---|---|---|
| 6,246,441 B1 * | 6/2001 | Terakado et al. ............ 348/552 |
| 6,882,352 B2 * | 4/2005 | Terakado et al. ............ 715/717 |
| 6,967,744 B1 * | 11/2005 | Kawamoto ................... 358/1.9 |
| 7,006,130 B2 * | 2/2006 | Harshbarger et al. ........ 348/189 |
| 7,137,099 B2 * | 11/2006 | Knight et al. ............... 717/100 |
| 7,240,335 B2 * | 7/2007 | Angel et al. ................ 717/130 |
| 7,526,598 B2 * | 4/2009 | Stern et al. ................. 711/100 |
| 7,546,296 B2 * | 6/2009 | Kimbara et al. .................. 1/1 |
| 2002/0035706 A1 * | 3/2002 | Connor et al. ................ 714/15 |
| 2002/0053072 A1 * | 5/2002 | Steinbusch et al. .......... 717/148 |
| 2002/0180757 A1 * | 12/2002 | Duerr et al. ................. 345/620 |
| 2003/0149967 A1 * | 8/2003 | Kamada et al. ............. 717/148 |
| 2005/0251588 A1 * | 11/2005 | Hoch et al. ..................... 710/5 |
| 2006/0123412 A1 * | 6/2006 | Hunt et al. .................. 717/174 |
| 2007/0136612 A1 * | 6/2007 | Asano et al. ................ 713/193 |
| 2008/0216053 A1 * | 9/2008 | Sluiman et al. ............. 717/124 |

FOREIGN PATENT DOCUMENTS

| | | |
|---|---|---|
| JP | HEI 11-088584 A | 3/1999 |
| JP | 2000-165563 A | 6/2000 |
| JP | 2004-303222 A | 10/2004 |

* cited by examiner

*Primary Examiner*—Emerson C Puente
*Assistant Examiner*—Charles Swift
(74) *Attorney, Agent, or Firm*—Harness, Dickey & Pierce, P.L.C.

(57) ABSTRACT

An activation program first activates a basic program and a first functional program, which realizes a specific function, among a plurality of functional programs, and then activates at least one second functional program among the functional programs after the first functional program is completely activated.

8 Claims, 11 Drawing Sheets

US 7,886,268 B2

INFORMATION PROCESSING APPARATUS AND COMPUTER PRODUCT

CROSS-REFERENCE TO RELATED APPLICATIONS

The present document incorporates by reference the entire contents of Japanese priority document, 2005-073326 filed in Japan on Mar. 15, 2005.

BACKGROUND OF THE INVENTION

1. Field of the Invention

The present invention relates to an information processing apparatus, an image forming apparatus, an activation program, and a storage medium.

2. Description of the Related Art

Digital multifunction image forming apparatuses called multifunction products (MFP) have multiple functions, such as a copy function, a facsimile (FAX) function, a printer function, a scanner function, and a function of distributing an input image that is scanned by the scanner function or input by the printer function or the FAX function. When the digital MFP is powered on, an activation process is performed after which the copy function, the printer function, or the like becomes available. Such a technology is disclosed in, for example, Japanese Patent Application Laid-Open No. 2004-303222.

FIG. 10 is a schematic of a software configuration stored in a storage medium of the digital MFP. An activation program p0, which is activated first upon power-on, and compressed files storing various programs, which are activated by the activation program p0, are stored in the storage medium. The compressed files include a compressed file f1 storing a basic program p1, a compressed file f2 storing a copy program p2 for executing a copy function, a compressed file f3 storing a printer program p3 for executing a printer function, and a compressed file f4 storing a font program p4 that is font data.

FIG. 11 is a sequence diagram of an activation process procedure performed by the digital MFP. In the activation process, the activation program p0 first reads all the compressed files f1 to f4 stored in the storage medium, and then activates the programs p1 to p4 stored in the compressed files f1 to f4, respectively, in this order. Each of the activated programs p1 to p4 performs an activation process. When the activation processes are finished, the copy program p2 requests the basic program p1 to draw a screen for an operation unit. That is, a screen for a copy operation is displayed on the operation unit at this point of time, so that a user of the MFP can use the copy function.

According to this conventional activation process procedure, however, when the copy mode is designated as a default mode, the printer program p3 and the font program p4 need to be loaded despite the fact that only the basic program p1 and the copy program p2 manage the copy function. This disadvantageously increases the time required for performing the activation process.

SUMMARY OF THE INVENTION

It is an object of the present invention to at least solve the problems in the conventional technology.

According to an aspect of the present invention, an information processing apparatus for realizing a plurality of functions by activating first upon power-on an activation program that subsequently activates a basic program and a plurality of functional programs that realize the functions includes a first activation unit that makes the activation program activate the basic program and a first functional program among the functional programs that realizes a specific function, and a second activation unit that makes the activation program activate at least one second functional program among the functional programs after the first functional program is completely activated.

According to another aspect of the present invention, an information processing apparatus for realizing a plurality of functions by activating first upon power-on an activation program that activates a basic program and a plurality of functional programs that realize the functions includes a unit that describes a program that is to be activated when any of the functional programs needs another program in association with the any one of the functional program, a hint listing unit that makes a list of hints about the functional programs, a call arbiter unit that manages transmission and reception of a message among the functional programs, a unit that makes the activation program activate only the basic program, a unit that makes the activation program read and interpret the list of hints, a unit that makes the activation program inquire the basic program of a described preference mode, wherein a preference mode is described in the basic program, a unit that makes the basic program inform the preference mode in response to the inquiry from the activation program, a unit that makes the activation program informed of the preference mode activate a first functional program that realizes the function of the preference mode according to the hints from the hint listing unit, a unit that calls a second functional program needed by the first functional program via the call arbiter unit when activating the first functional program, a unit that makes the call arbiter unit request the activation program to activate the second functional program when calling the second functional program needed by the first functional program fails, a unit that makes the activation program having received an activation request activate the second functional program, a unit that makes the second functional program respond to calling by the first functional program via the call arbiter unit when an activation of the second functional program is completed, a unit that makes the first functional program make a screen drawing request to the basic program when the second functional program responds to calling by the first functional program, a unit that makes the basic program display a screen of a function that is realized by the first functional program, a unit that makes the basic program having received the screen drawing request inform the activation program of completion of an activation of the first functional program, and a unit that makes the activation program activate an inactivated functional program among the functional programs when informed of completion of the activation of the first functional program that realizes the function of the preference mode.

According to still another aspect of the present invention, An information processing apparatus for realizing a plurality of functions by activating first upon power-on an activation program that activates a basic program and a plurality of functional programs that realize the functions includes a dependency relationship describing unit that describes a dependency relationship among the programs, a unit that makes the activation program activate only the basic program, a unit that makes the activation program inquire the basic program of a described preference mode, wherein a preference mode is described in the basic program, a unit that makes the basic program inform the preference mode in response to the inquiry from the activation program, a unit that makes the activation program informed of the preference mode activate a first functional program that realizes the function of the preference mode, a unit that makes the activation program read and interpret the dependency relationship corresponding to the first functional program when activating the first functional program, a unit that activates a second functional program when there is the second functional program on which the first functional program depends according to the dependency relationship, a unit that makes the first functional program make a screen drawing request to the basic program when an activation process of the first functional program is completed, a unit that makes the basic program display a screen of a function that is realized by the first functional program, a unit that makes the basic program having received the screen drawing request inform the activation program of completion of an activation of the first functional program, and a unit that makes the activation program activate an inactivated functional program among the functional programs when informed of completion of the activation of the first functional program that realizes the function of the preference mode.

According to still another aspect of the present invention, a computer-readable recording medium stores therein a computer program that implements a method according to the present invention on a computer.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

A first embodiment of the present invention is explained with reference to FIGS. 1 to 3. The first embodiment is an example of an information processing apparatus. (image forming apparatus) adapted to a digital MPF. The MFP has multiple functions, such as a copy function, a FAX function, a printer function, a scanner function, and a function of distributing an input image that is scanned by the scanner function or an image input by the printer function or the FAX function.

Figure 1:
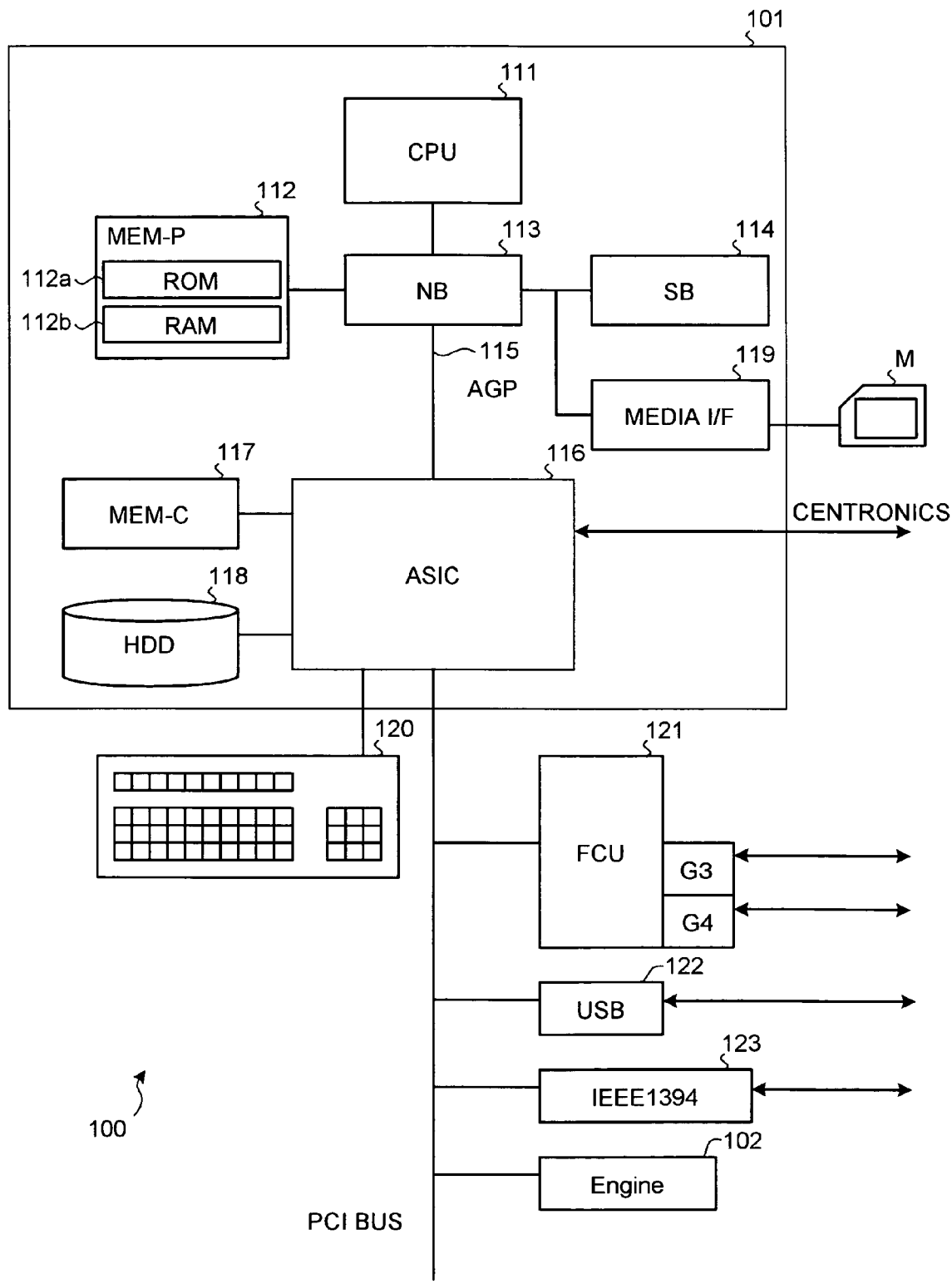
FIG. 1 is a block diagram of a hardware configuration of a digital MFP according to a first embodiment of the present invention.

FIG. 1 is a block diagram of a hardware configuration of a digital MFP 100 according to the first embodiment. The digital MFP 100 includes a controller 101 and an engine unit 102 connected by a peripheral component interconnect (PCI) bus.

The controller 101 performs the general control of the digital MFP 100, and controls the drawing and communications thereof, and inputs from an operation unit 120. The operation unit 120 accepts an input operation made by a user of the machine, and provides a display to the user. The engine unit 102 is a printer engine connectable to the PCI bus, such as a monochromatic plotter, a one-drum color plotter, a four-drum color plotter, a scanner, or a FAX unit. The engine unit 102 includes an information processing portion, such as error diffusion and gamma conversion, in addition to the so-called engine portion like a plotter.

The controller 101 includes a central processing unit (CPU) 111, a system memory (MEM-P) 112, a northbridge (NB) 113, a southbridge (SB) 114, an application specific integrated circuit (ASIC) 116, a local memory (MEM-C) 117, a hard disk drive (HDD) 118, and a media interface (I/F) 119. The NB 113 and the ASIC 116 are connected together by an accelerated graphics port (AGP) bus 115. The MEM-P 112 further includes a read only memory (ROM) 112a, and a random access memory (RAM) 112b.

The CPU 111 performs the general control of the digital MFP 100. The CPU 111 includes a chipset including the NB 113, the MEM-P 112, and the SB 114, and is connected to another device via the chipset.

The NB 113 is a bridge that connects the CPU 111 to the MEM-P 112, the SB 114, the AGP bus 115, and the media I/F 119. The NB 113 includes a memory controller that controls reading and writing of the MEM-P 112, a PCI master, and an AGP target.

The MEM-P 112 is a system memory that is used as a memory for storing a program and data, a memory for mapping a program and data, an image writing memory for the printer, or the like. The MEM-P 112 includes the ROM 112a and the RAM 112b. The ROM 112a is used for storing a program and data that control the operation of the CPU 111, and the RAM 112b is used for mapping a program and data and as an image writing memory for the printer or the like.

The SB 114 is a bridge that connects the NB 113 to a PCI device and a peripheral device. The SB 114 is connected to the NB 113 via the PCI bus to which, for example, a network interface (I/F) unit is connected.

The ASIC 116 is an information processing integrated circuit (IC) having hardware elements for information processing, and serves as a bridge that connects the AGP bus 115, the PCI bus, the HDD 118, and the MEM-C 117 to one another. The ASIC 116 includes a PCI target, an AGP master, an arbiter (ARB) that is the core of the ASIC 116, a memory controller that controls the MEM-C 117, a plurality of direct memory access controllers (DMACs) that perform rotation or the like of image data by a hardware logic or the like, and a PCI unit that performs data transfer with the engine unit 102 via the PCI bus. The ASIC 116 is connected with a FAX control unit (FCU) 121, a universal serial bus (USB) 122, and an IEEE 1394 (the Institute of Electrical and Electronics Engineers 1394) interface 123 via the PCI bus.

The MEM-C 117 is a local memory to be used as a copy image buffer and a code buffer. The HDD 118 is a storage that stores image data and a form.

The AGP bus 115 is a bus interface for a graphics accelerator card proposed to accelerate graphic processes. The AGP bus 115 accelerates the graphics accelerator card by directly accessing the MEM-P 112 at a high throughput.

The media I/F 119 is an interface or an insertion slot for an external recording medium M (e.g., a secure digital (SD) card) as a detachable non-volatile storage medium. When the external recording medium M is inserted in the slot, whether the external recording medium M is inserted can be identified from a fluctuation or the like of the voltage (hot swap). The external recording medium M stores various programs to control the operation of the CPU 111, and font data.

Figure 2:
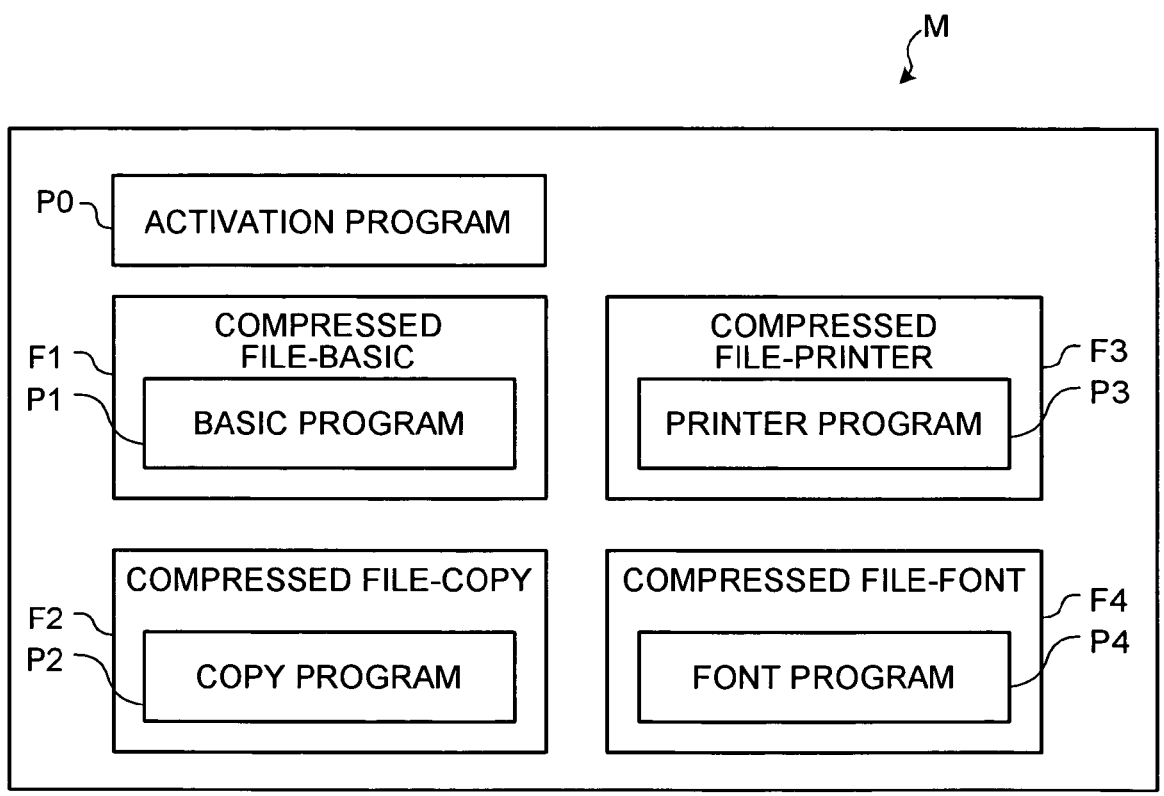
FIG. 2 is a schematic of a software configuration stored in an external recording medium shown in FIG. 1.

FIG. 2 is a schematic of a software configuration stored in the external recording medium M. The external recording medium M stores an activation program P0, and compressed files storing various programs. FIG. 2 depicts, as the compressed files being the featured function of the first embodiment, a compressed file F1 storing a basic program P1, a compressed file F2 storing a copy program P2 for executing a copy function, a compressed file F3 storing a printer program P3 for executing a printer function, and a compressed file F4 storing a font program P4 that is font data.

When the digital MFP 100 is turned on, a basic input/output system (BIOS) and a boot loader in the ROM 112a are activated. The boot loader maps a Kernel and a root file system on the RAM 112b and activates the Kernel. The Kernel mounts the root file system. The term "mount" means to activate a file system, a peripheral device, and the like in an accessible manner.

After the Kernel is activated, the activation program P0 that activates various programs is activated. The various programs includes, for example, the basic program P1, the copy program P2, the printer program P3, and the font program P4. The activation program P0 is a process that is activated first in the digital MFP 100, mounts a file system according to a predetermined setting file, and activates programs necessary for the operation of the digital MFP 100, stored in the external recording medium M, according to the predetermined setting file.

In the conventional digital MFP (information processing apparatus), the activation program reads all the compressed files and then activates programs stored in the files in order. When a copy mode is designated as the default mode, for example, the printer program P3 and the font program P4 should be loaded despite the fact that it is only the basic program P1 and the copy program P2 that manage the copy function, making the activation time longer.

The activation program P0 according to the first embodiment precedes the activation of only those programs that provide a function needed by the user, so that the function needed by the user becomes available upon power-on. The activation program P0 according to the first embodiment is added with a timer program that can count a time elapsing from a set time by a given time. An activation process procedure is described in detail below.

Figure 3:
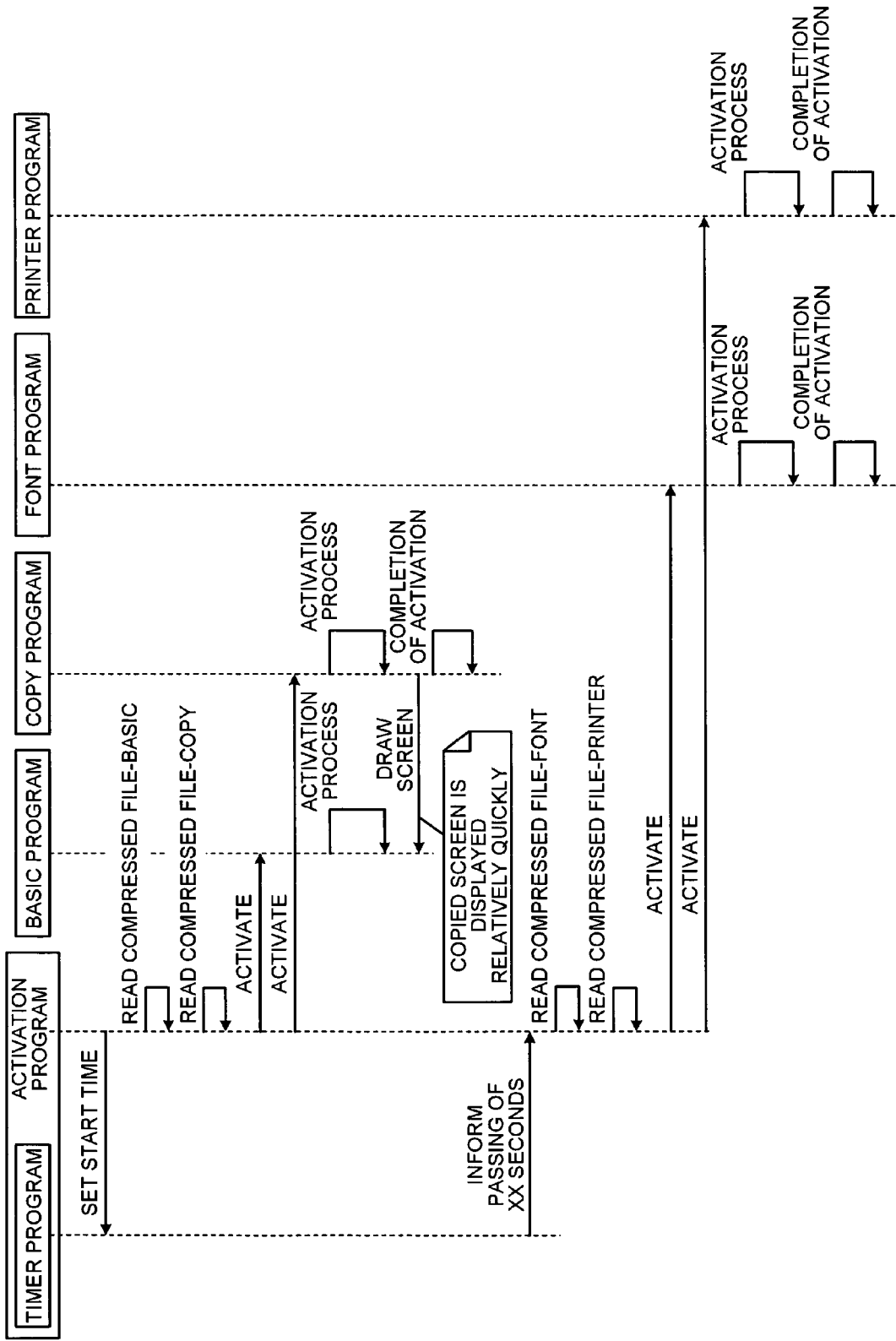
FIG. 3 is a sequence diagram of an activation process procedure performed by the digital MFP.

FIG. 3 is a sequence diagram of the activation process procedure performed by the digital MFP 100. First, the activation program P0 sets a start time, and starts counting a time elapsing from the set time by a given time using a timer built in the CPU 111. The given time to be counted is adjusted at the time of product shipment.

The activation program P0 reads the compressed file F1 storing the basic program P1, and the compressed file F2 storing the copy program P2 from the external recording medium M, and activates both the compressed files.

The two activated programs perform the respective activation processes. When the activation processes are completed, the copy program P2 makes a screen drawing request for the operation unit 120 to the basic program P1. That is, a screen for a copy operation is displayed on the operation unit 120 at this point of time, and the user can use the copy function.

When the given time elapses from the beginning of the operation of the activation program P0, the activation program P0 reads other compressed files (the compressed file F3 storing the printer program P3, and the compressed file F4 storing the font program P4), and activates the compressed files. When the activation is completed, the user can use the printer function.

According to the first embodiment, the activation program first activates the basic program and the functional program that realizes a specific function, and then activates an inactivated functional program in the functional programs when a given time elapses from the beginning of the operation of the activation program after the specific function becomes available. Thus, it is possible to precede the activation of only those programs that provide the function needed by the user, so that the user can use the needed function immediately upon power-on. A program unnecessary for activation of the function needed by the user does not interfere with the operation of the programs that provide the function needed by the user, which can shorten the apparent activation time. Furthermore, the structure of the activation program is hardly changed from the conventional activation program.

A second embodiment of the present invention is explained with reference to FIGS. 4 and 5. In the second embodiment, like reference numerals as those of the first embodiment denote like parts to avoid redundant descriptions. In the first embodiment, the copy function can be used before the activation of the entire apparatus is completed. To provide a better apparatus, there are two points to address. First, the user who wants to use the printer function by preference has to wait until the entire apparatus is activated. Secondly, a given time to be counted should be adjusted at the time of product shipment. To deal with the first point, the second embodiment allows the user to input a function to be used by preference, and writes a list of files needed for activation in each preference mode in a recording medium. To deal with the second point, the basic program P1 informs the activation program P0 of the completion of screen drawing without counting the time.

Figure 4:
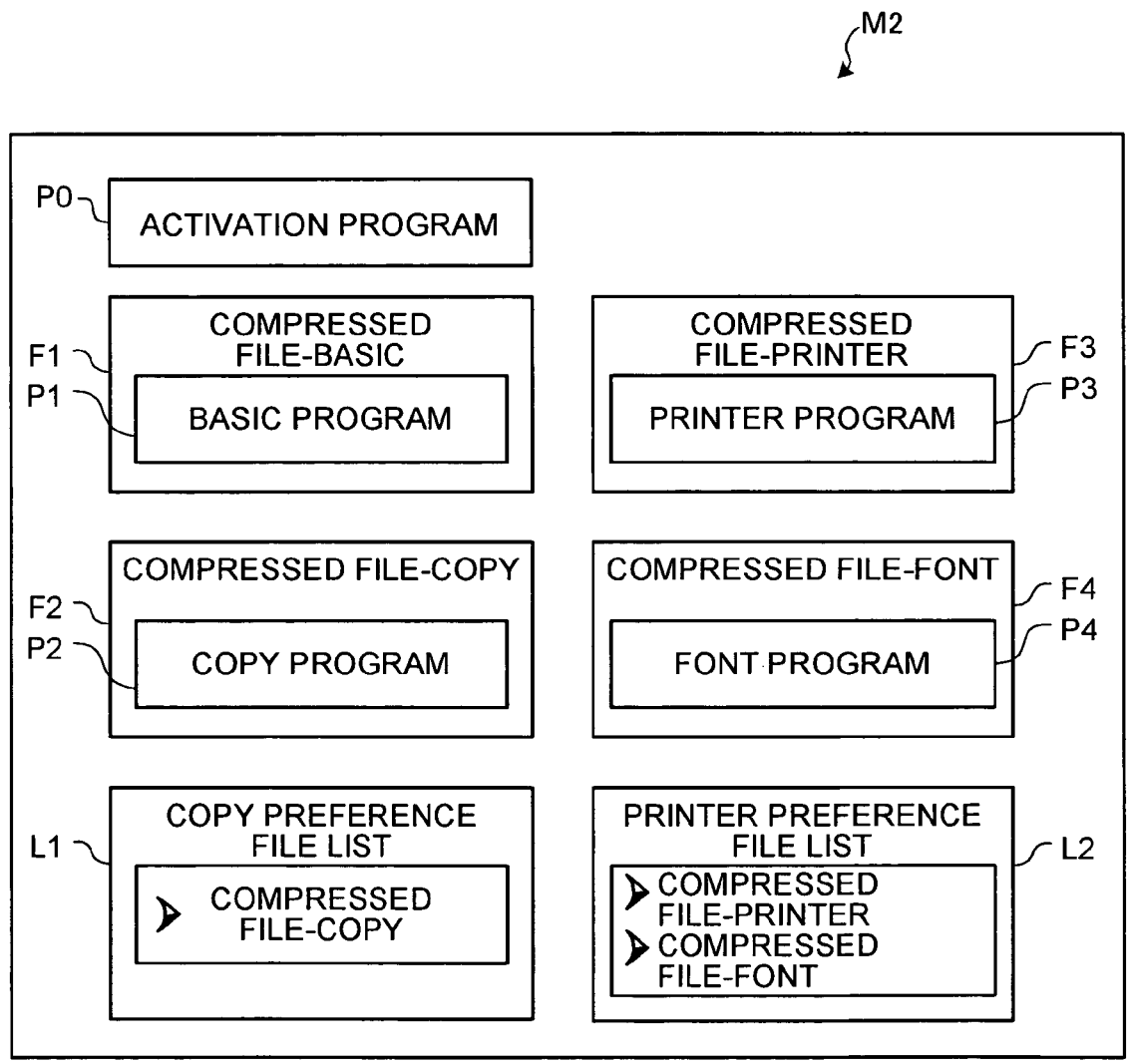
FIG. 4 is a schematic of a software configuration stored in an external recording medium of a digital MFP according to a second embodiment of the present invention.

FIG. 4 is a schematic of the software configuration stored in an external recording medium M2 of a digital MFP according to the second embodiment. The external recording medium M2 stores the activation program P0, and compressed files (the compressed file F1 storing the basic program P1, the compressed file F2 storing the copy program P2 for executing a copy function, the compressed file F3 storing the printer program P3 for executing a printer function, and the compressed file F4 storing the font program P4 that is font data, explained in the first embodiment). In addition, according to the second embodiment, a list L1 of files needed at the time of activation in copy preference mode and a list L2 of files needed at the time of activation in printer preference mode are stored in the external recording medium M2.

Figure 5:
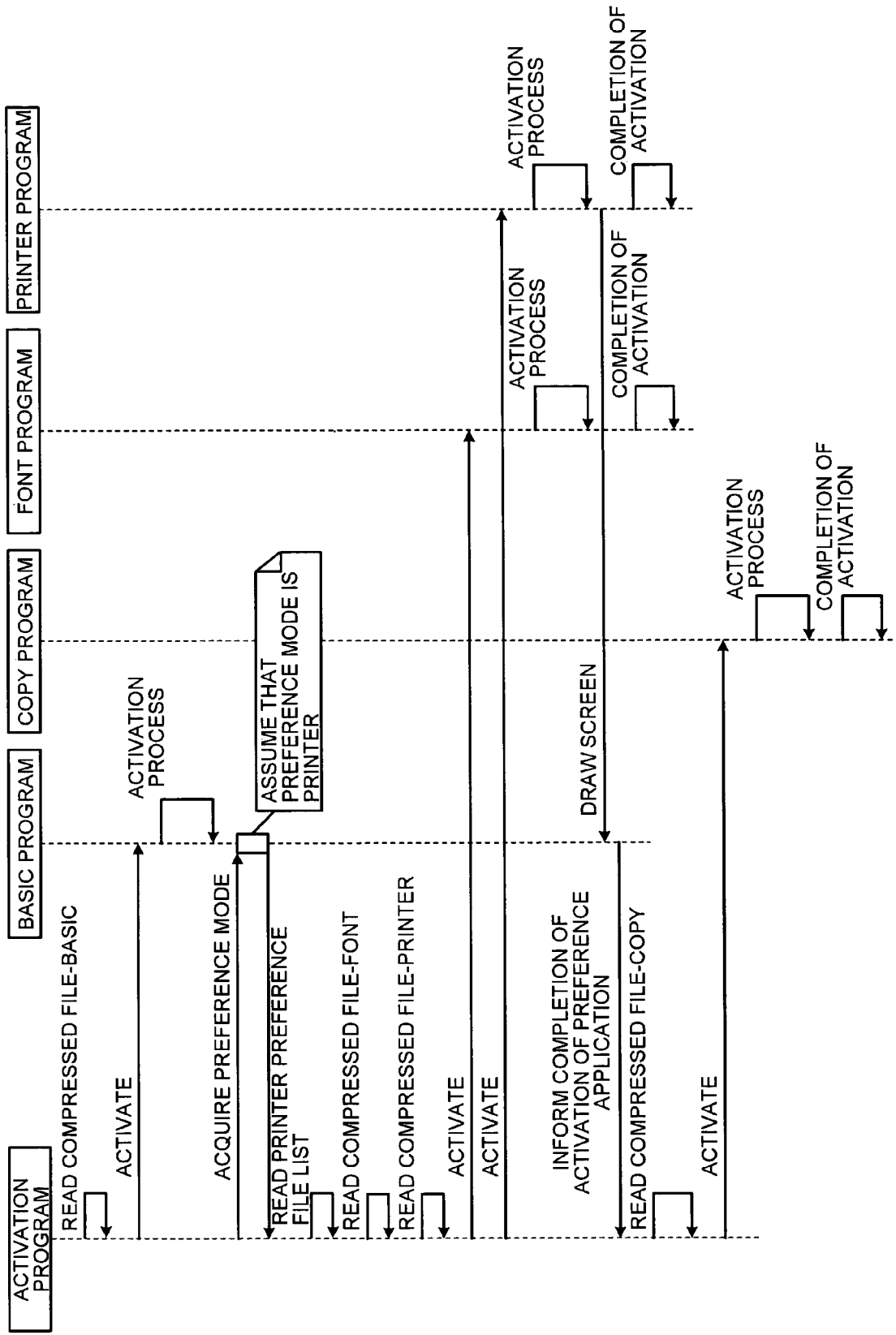
FIG. 5 is a sequence diagram of the activation process procedure performed by a digital MFP according to the second embodiment.

FIG. 5 is a sequence diagram of the activation process procedure performed by the digital MFP according to the second embodiment. As shown in FIG. 5, the activation program P0 first reads only the compressed file F1 storing the basic program P1 from the external recording medium M2, and activates the compressed file F1.

Because the preference mode set by the user is described in the basic program P1, the activation program P0 inquires the basic program P1 of the preference mode.

The basic program P1 informs the activation program P0 of the preference mode in response to the inquiry made by the activation program P0. It is assumed that the preference mode is the printer preference mode.

The activation program P0 informed of the preference mode (printer preference mode) reads the printer preference file list L1, and knows that a compressed file-font and a compressed file-printer are files necessary in activation in the printer preference mode.

The activation program P0 reads the compressed file F3 storing the printer program P3, and the compressed file F4 storing the font program P4, and activates both the compressed files.

The two activated programs perform the respective activation processes. When the activation processes are completed, the printer program P3 makes a screen drawing request for the operation unit 120 to the basic program P1. At this point of time, a screen for a printer operation is displayed on the operation unit 120, so that the user can use the printer function.

The basic program P1 having received the screen drawing request informs the activation program P0 of the completion of the activation of the printer program P3.

When being informed of the completion of the activation of the program that realizes the function of the preference mode, the activation program P0 reads the other compressed file (the compressed file F2 storing the copy program P2), and activates the compressed file. When the activation is completed, the user can use the copy function.

According to the second embodiment, the activation program first activates the basic program and a first functional program that realizes the function of a preference mode designating a preceded function in various functions, and then activates an inactivated functional program in the functional programs after the first functional program becomes available. Thus, it is possible to precede the activation of only the first functional program that provides the function needed by the user, so that the user can use the needed function of the preference mode immediately upon power-on. In addition, a program unnecessary for activation of the function of the preference mode needed by the user does not interfere with the operation of the first functional program that provides the function of the preference mode needed by the user, which can shorten the apparent activation time.

A third embodiment of the present invention is explained below with reference to FIGS. 6 and 7. In the third embodiment, like reference numerals as those of the first or the second embodiment denote like parts to avoid redundant descriptions. According to the second embodiment, a list of files needed in the activation in the preference mode is written in the recording medium, and the basic program P1 informs the activation program P0 of the completion of screen drawing without counting time, so that a desired function becomes available before the activation of the entire apparatus is completed. According to the second embodiment, however, the preference file lists L1 and L2 need to be accurately written according to the software configuration at the time of product shipment. Because the software of recent information processing apparatuses have complicated configurations, the preference file lists might be described inaccurately. Thus, the third embodiment employs a dynamic method of activating a required program when one program requires another program.

Figure 6:
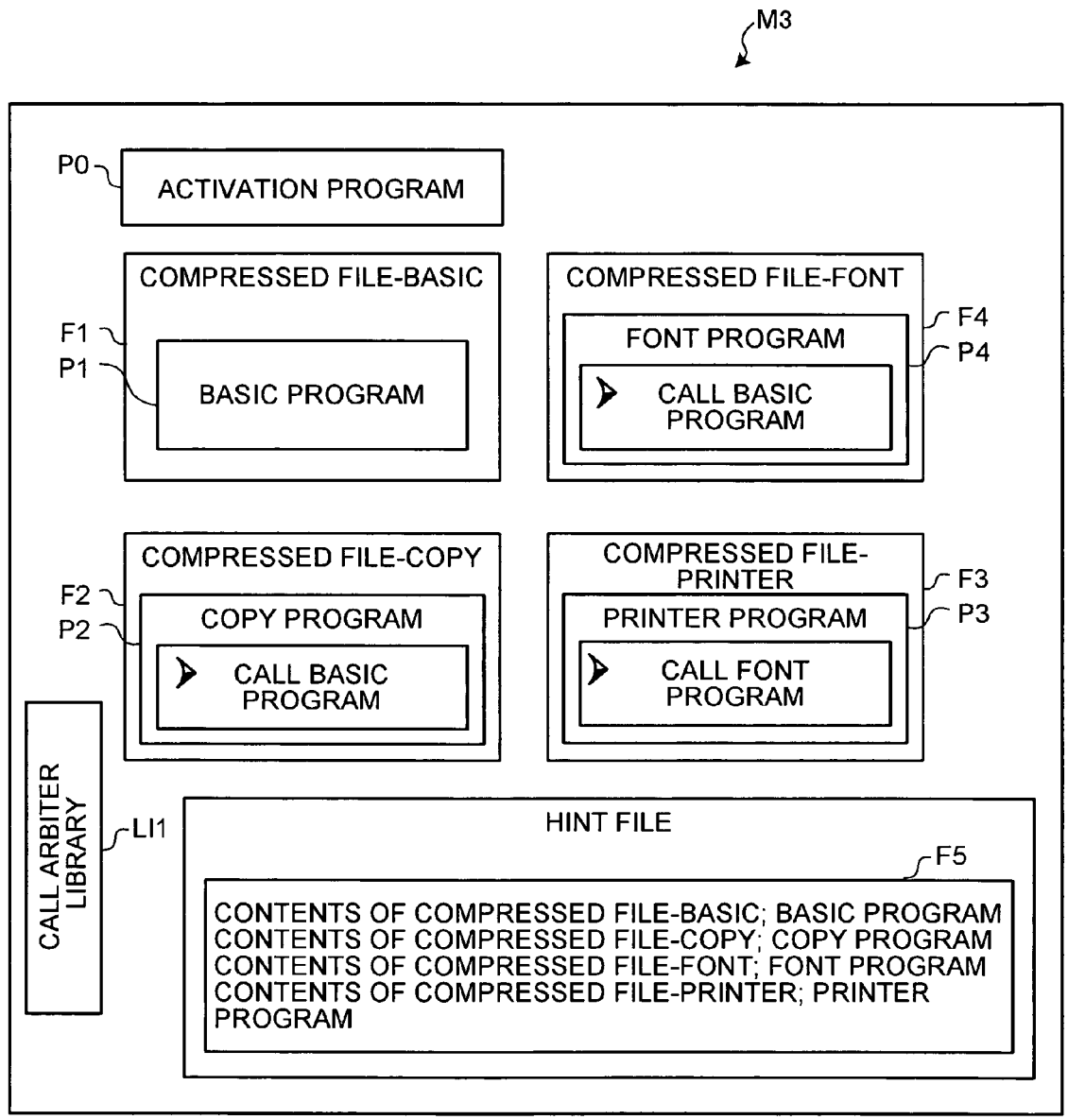
FIG. 6 is a schematic of a software configuration stored in an external recording medium according to a third embodiment of the present invention.

FIG. 6 is a schematic of the software configuration stored in an external recording medium M3 according to the third embodiment. The external recording medium M3 stores the activation program P0, and compressed files (the compressed file F1 storing the basic program P1, the compressed file F2 storing the copy program P2 for executing a copy function, the compressed file F3 storing the printer program P3 for executing a printer function, and the compressed file F4 storing the font program P4 that is font data, explained in the first embodiment). A program that is activated when one program requires another program is described in each of the compressed files F2, F3, and F4. That is, every time a predetermined program is called, a called program is activated according to the description in the compressed file of the predetermined program. According to the third embodiment, a hint file F5 that is a hint listing unit that lists compressed files and the contents of the compressed files, and a call arbiter library LI1 that is a call arbiter unit that manages transmission and reception of messages among programs are stored in the external recording medium M3. That is, according to the third embodiment, programs transmit and receive messages to and from one another by using the call arbiter library LI1.

Figure 7:
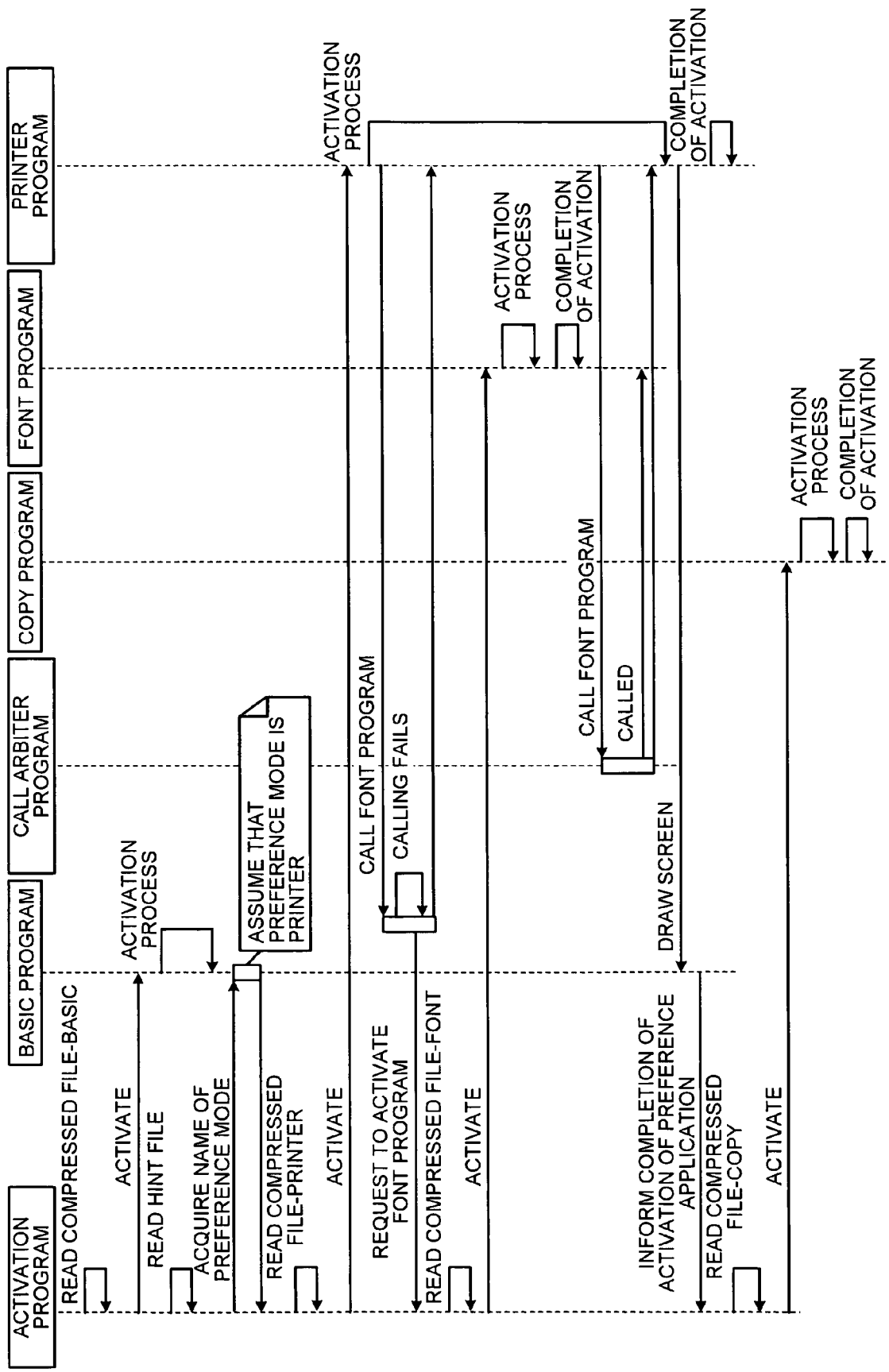
FIG. 7 is a sequence diagram of the activation process procedure performed by a digital MFP according to the third embodiment.

FIG. 7 is a sequence diagram of the activation process procedure performed by the digital MFP according to the third embodiment. The activation program P0 first reads only the compressed file F1 storing the basic program P1 from the external recording medium M3, and activates the compressed file F1, and then reads the hint file F5 to know the contents of the compressed files.

Because the preference mode set by the user is described in the basic program P1, the activation program P0 inquires the basic program P1 of the preference mode.

The basic program P1 informs the activation program P0 of the preference mode in response to the inquiry made by the activation program P0. It is assumed that the preference mode is the printer preference mode.

The activation program P0 informed of the preference mode (printer preference mode) reads the compressed file F3 storing the printer program P3, and activates the printer program P3.

During the activation process, the printer program P3 calls the font program P4 according to the description of the compressed file F3. In this example, the call arbiter library LI1 tries to call the font program P4. Because the font program P4 has not been activated yet, however, the call arbiter library LI1 requests the activation program P0 to activate the font program P4. At this point, therefore, calling the font program P4 fails. The printer program P3 repeats calling the font program P4 until the calling succeeds.

The activation program P0 that has received the activation request from the call arbiter library LI1 reads the compressed file F4 storing the font program P4, and activates the compressed file F4.

When activation of the font program P4 is completed, the font program P4 responds to calling of the printer program P3 via the call arbiter library LI1. When the font program P4 responds to calling of the printer program P3, the printer program P3 makes a screen drawing request for the operation unit 120 to the basic program P1. At this point of time, a screen for the printer operation is displayed on the operation unit 120, so that the user can use the printer function.

The basic program P1 having received the screen drawing request informs the activation program P0 of the completion of the activation of the printer program P3.

When being informed of the completion of the activation of the program that realizes the function of the preference mode, the activation program P0 reads the other compressed file (the compressed file F2 storing the copy program P2), and activates the compressed file. When the activation is completed; the user can use the copy function.

According to the third embodiment, the activation program first activates the basic program and the first functional program that realizes the function of the preference mode designating a preceded function in various functions, and then activates an inactivated functional program in the functional programs after the first functional program becomes available. Thus, it is possible to precede the activation of only the first functional program of the preference mode that provides the function needed by the user, so that the user can use the needed function of the preference mode immediately upon power-on. In addition, a program unnecessary for activation of the function of the preference mode needed by the user does not interfere with the operation of the first functional program that provides the function of the preference mode needed by the user, which can shorten the apparent activation time. When a program requires another program, the required program can be activated at this time, therefore, a plurality of programs can be surely activated.

A fourth embodiment of the present invention is explained below with reference to FIGS. 8 and 9. Like reference numerals as those of the first or the second embodiment denote like parts to avoid redundant descriptions. The fourth embodiment employs a static method of writing, beforehand, a program on which one program depends in a recording medium at the time of product shipment.

Figure 8:
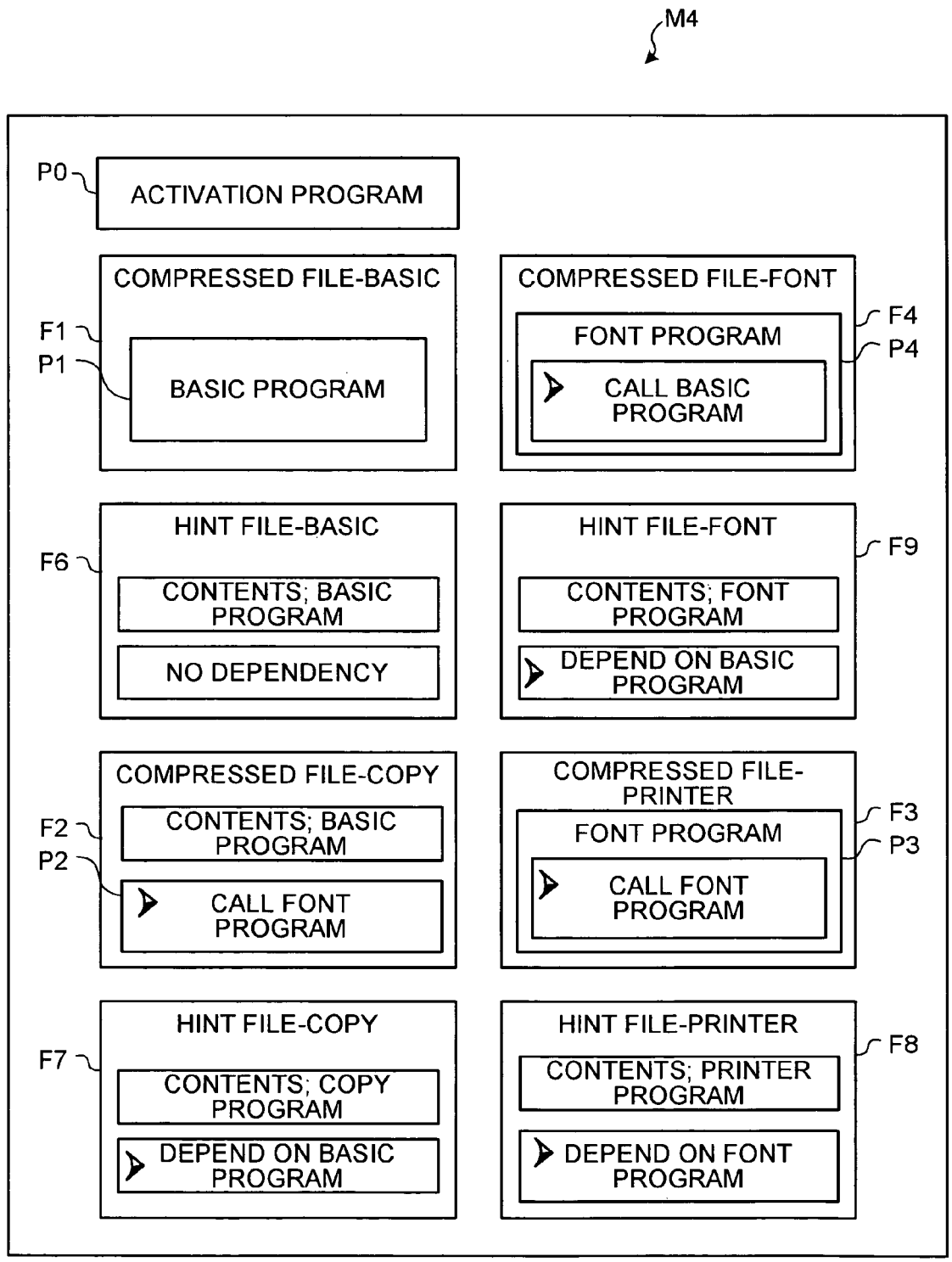
FIG. 8 is a schematic of a software configuration stored in an external recording medium of a digital MFP according to a fourth embodiment of the present invention.

FIG. 8 is a schematic of the software configuration stored in an external recording medium M4 according to the fourth embodiment. The external recording medium M4 stores the activation program P0, and compressed files (the compressed file F1 storing the basic program P1, the compressed file F2 storing the copy program P2 for executing a copy function, the compressed file F3 storing the printer program P3 for executing a printer function, and the compressed file F4 storing the font program P4 that is font data, explained in the first embodiment). A program that is activated when one program requires another program is described in each of the compressed files F2, F3, and F4. That is, every time a predetermined program is called, a called program is activated according to the description in the compressed file of the predetermined program. According to the fourth embodiment, hint files F6 to F9 that are dependency relationship describing units that describe the contents of individual compressed files and the dependency relationship are stored in the external recording medium M4 for the respective compressed files. Each of the hit files F6 to F9 is a called portion in the associated program that is mechanically written out at the time of product shipment.

Figure 9:
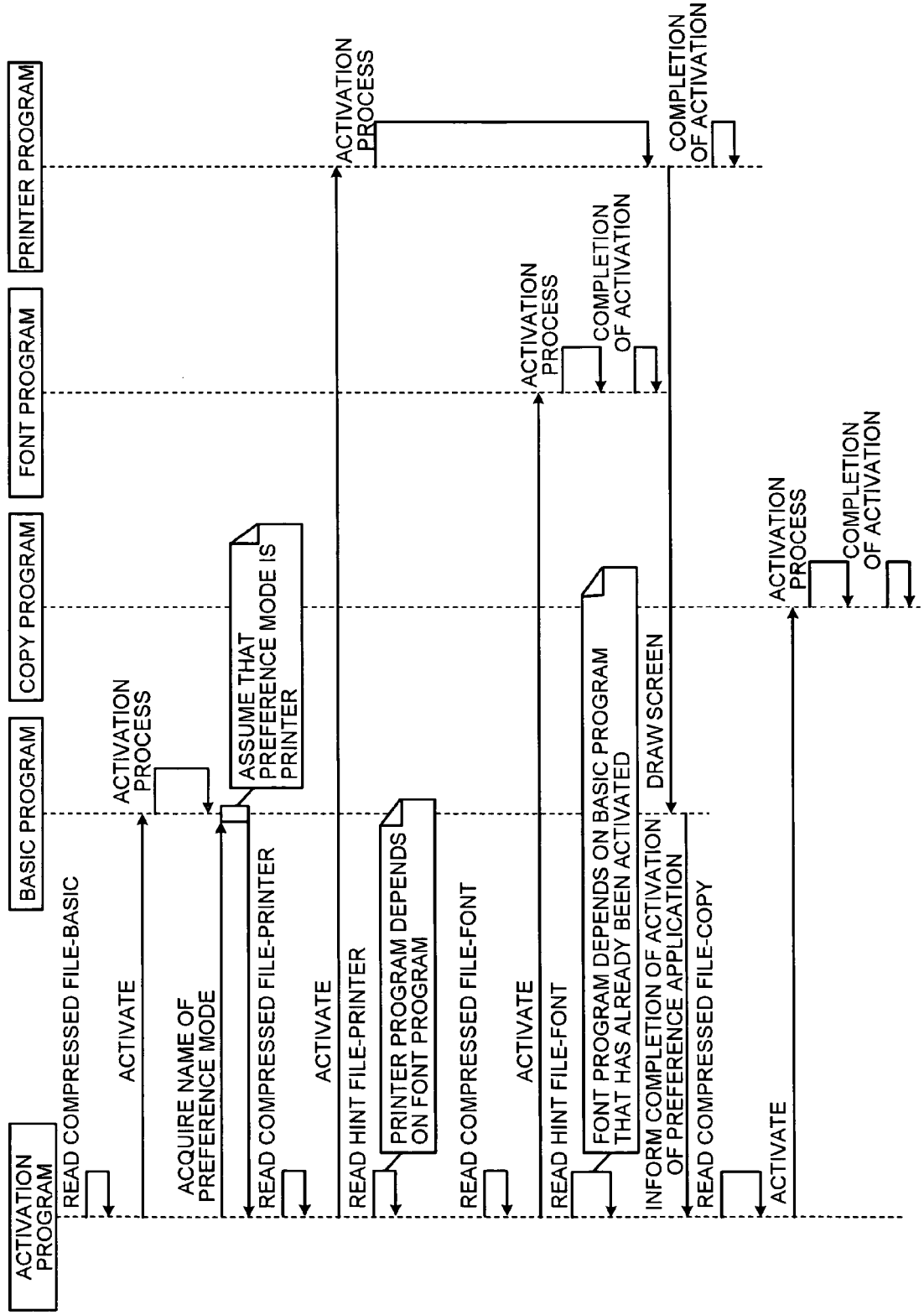
FIG. 9 is a sequence diagram of the activation process procedure performed by a digital MFP according to the fourth embodiment.
Figure 10:
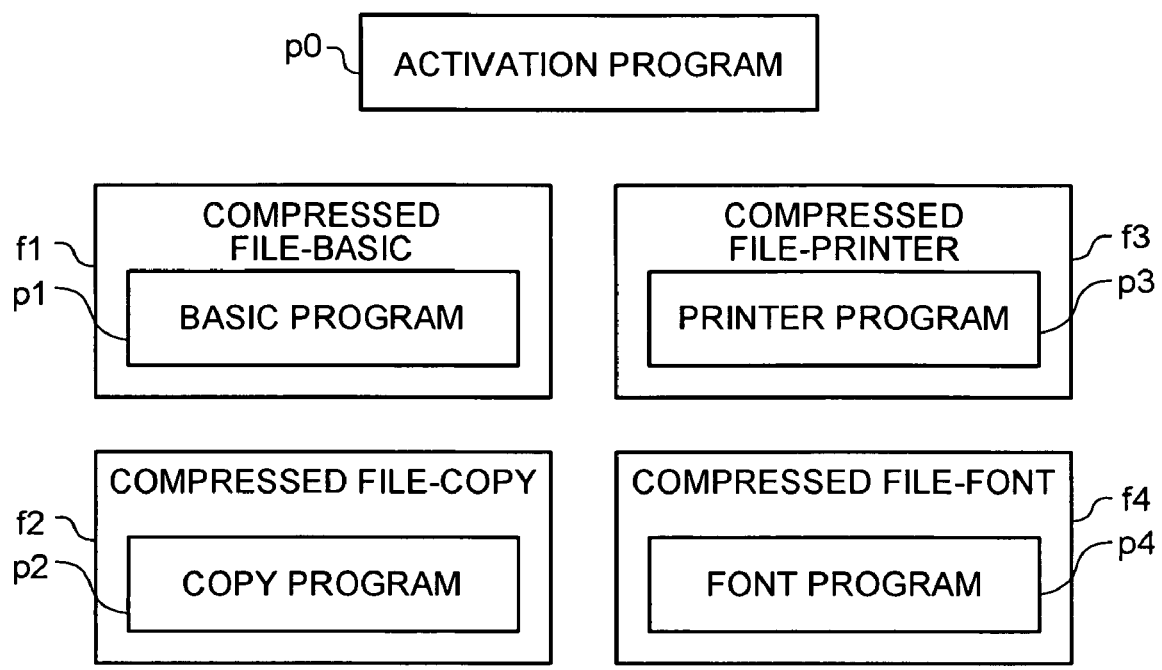
FIG. 10 is a schematic of a software configuration of a conventional digital MFP.
Figure 11:
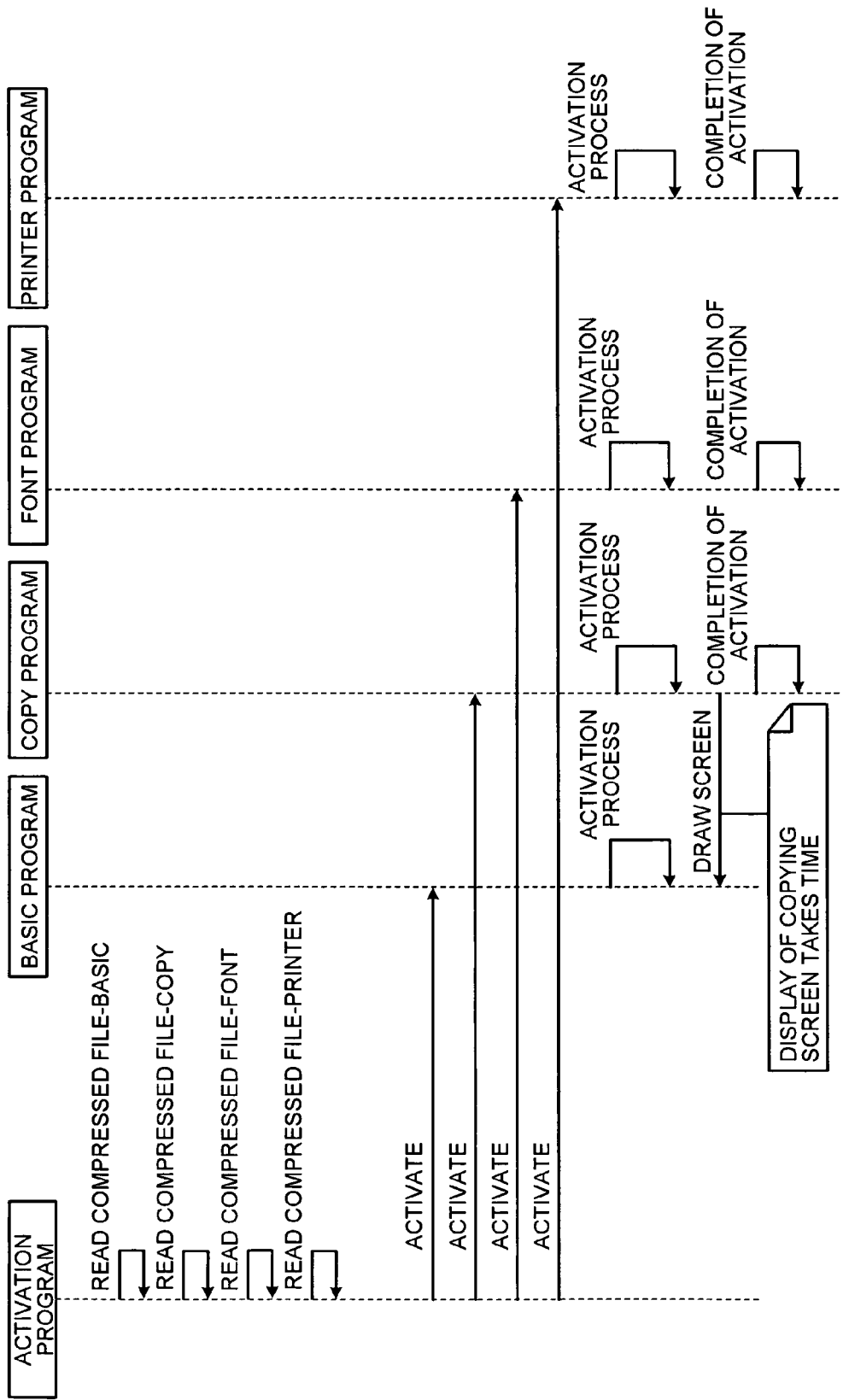
FIG. 11 is a sequence diagram of an activation process procedure performed by a conventional digital MFP.

FIG. 9 is a sequence diagram of the activation process procedure performed by the digital MFP according to the fourth embodiment. The activation program P0 first reads only the compressed file F1 storing the basic program P1 from the external recording medium M4, and activates the compressed file F1.

Because the preference mode set by the user is described in the basic program P1, the activation program P0 inquires the basic program P1 of the preference mode.

The basic program P1 informs the activation program P0 of the preference mode in response to the inquiry made by the activation program P0. It is assumed that the preference mode is the printer preference mode.

The activation program P0 informed of the preference mode (printer preference mode) reads the compressed file F3 storing the printer program P3, and activates the printer program P3.

Thereafter, the activation program P0 reads a hint file-printer F8 corresponding to the activated printer program P3. Because the activation program P0 understands from the hint file F8 that the printer program P3 depends on the font program P4, the activation program P0 reads the compressed file F4 storing the font program P4, and activates the compressed file F4.

Then, the activation program P0 reads a hint file-font F9 corresponding to the font program P4. Because the basic program P1 on which the hint file F9 depends has already been activated, nothing is performed at this point of time.

When the activation processes of the printer program P3 and the font program P4 are executed this way, the printer program P3 makes a screen drawing request for the operation unit 120 to the basic program P1. At this point of time, the screen for the printer operation is displayed on the operation unit 120, so that the user can use the printer function.

The basic program P1 having received the screen drawing request informs the activation program P0 of the completion of the activation of the printer program P3.

When being informed of the completion of the activation of the program that realizes the function of the preference mode, the activation program P0 reads the other compressed file (the compressed file F2 storing the copy program P2), and activates the compressed file. When the activation is completed, the user can use the copy function.

According to the fourth embodiment, the activation program first activates the basic program and the first functional program that realizes the function of the preference mode designating a preceded function in various functions, and then activates an inactivated functional program in the functional programs after the first functional program becomes available. Thus, it is possible to precede the activation of only the first functional program that provides the function needed by the user, so that the user can use the needed function of the preference mode immediately upon power-on. In addition, a program unnecessary for activation of the function of the preference mode needed by the user does not interfere with the operation of the first functional program that provides the function of the preference mode needed by the user, which can shorten the apparent activation time. Because a program on which one program depends can be written at the time of product shipment, a plurality of programs can be activated surely.

According to the embodiments, it is possible to precede the activation of only those programs that provide the function needed by the user, so that the user can use the needed function immediately upon power-on. In addition, a program unnecessary for activation of the function needed by the user does not interfere with the operation of the programs that provide the function needed by the user, which can shorten the apparent activation time.

Furthermore, the structure of the activation program is hardly changed from the conventional activation program.

Moreover, it is possible to precede the activation of only the first functional program that provides the function of the preference mode needed by the user, so that the user can use the needed function of the preference mode immediately upon power-on. In addition, a program unnecessary for activation of the function of the preference mode needed by the user does not interfere with the operation of the first functional program that provides the function of the preference mode needed by the user, which can shorten the apparent activation time.

Furthermore, when a program requires another program, the required program can be activated at this time, therefore, a plurality of programs can be surely activated.

Moreover, because a program on which another program depends can be written in advance at the time of product shipment, a plurality of programs can be activated surely.

Furthermore, a plurality of programs can be surely activated.

Further, according to the storage medium of the embodiments, any of the activation programs explained above can be handled in a tangible form, thus improving the portability.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus for realizing a plurality of functions by activating first upon power-on an activation program that activates a basic program and a plurality of functional programs that realize the functions, comprising:
    a unit that describes a program that is to be activated when any of the functional programs needs another program in association with the any one of the functional program;
    a hint listing unit that makes a list of hints about the functional programs;
    a call arbiter unit that manages transmission and reception of a message among the functional programs;
    a unit that makes the activation program activate only the basic program;
    a unit that makes the activation program read and interpret the list of hints;
    a unit that makes the activation program inquire the basic program of a described preference mode, wherein a preference mode is described in the basic program;
    a unit that makes the basic program inform the preference mode in response to the inquiry from the activation program;
    a unit that makes the activation program informed of the preference mode activate a first functional program that realizes the function of the preference mode according to the hints from the hint listing unit;
    a unit that calls a second functional program needed by the first functional program via the call arbiter unit when activating the first functional program;
    a unit that makes the call arbiter unit request the activation program to activate the second functional program when calling the second functional program needed by the first functional program fails, and repeats calling the second functional program while the activation program activates the second functional program until the activation program completes activation of the second functional program and the calling succeeds;
    a unit that makes the activation program having received an activation request activate the second functional program;
    a unit that makes the second functional program respond to calling by the first functional program via the call arbiter unit when an activation of the second functional program is completed;
    a unit that makes the first functional program make a screen drawing request to the basic program when the second functional program responds to calling by the first functional program;
    a unit that makes the basic program display a screen of a function that is realized by the first functional program;
    a unit that makes the basic program having received the screen drawing request inform the activation program of completion of an activation of the first functional program; and
    a unit that makes the activation program activate an inactivated functional program among the functional programs when informed of completion of the activation of the first functional program that realizes the function of the preference mode.

2. The information processing apparatus according to claim 1, further comprising:
    a dependency relationship describing unit that describes a dependency relationship among the programs,
    wherein the dependency relationship describing unit is a called portion in a program that is written out.

3. A computer-readable recording medium that stores therein a computer program that activates a basic program and a plurality of functional programs that realize various functions upon power-on, wherein the computer program causes a computer to execute:
    activating firstly the basic program and a first functional program among the functional programs that realizes a specific function;
    calling a second functional program, from among the plurality functional programs, needed by the first functional program;
    requesting activation of the second functional program when calling the second functional program needed by the first functional program fails, and repeating the calling of the second functional program while the second functional program is being activated until activation of the second functional program is complete and the calling succeeds; and
    activating secondly an inactivated functional program among the functional programs after the first functional program is completely activated.

4. The computer-readable recording medium according to claim 3, wherein the computer program further causes the computer to execute:
    counting a time from when the computer program is activated; and
    activating secondly an inactivated functional program among the functional programs upon the time counted elapses a predetermined time.

5. The computer-readable recording medium according to claim 3, wherein the computer program further causes the computer to execute:
    setting priority of activation of the functions in the basic program;
    activating only the basic program;
    acquiring the priority of activation of the functions from the basic program; and
    activating a functional program among the functional programs that realizes a function having highest priority as the first functional program.

6. The computer-readable recording medium according to claim 3, wherein the computer program further causes the computer to execute:
    activating the first functional program that realizes a copy function.

7. A computer-readable recording medium that stores therein a computer program that activates a basic program and a plurality of functional programs that realize various functions upon power-on, wherein the computer program causes a computer to execute:
- managing transmission and reception of a message among the functional programs;
- activating only the basic program;
- reading and interpreting a hint file listing hints about the functional programs;
- inquiring the basic program of a described preference mode;
- activating a first functional program that realizes the function of the preference mode according to the hints in the hint file when informed of the preference mode;
- calling a second functional program needed by the first functional program;
- requesting activation of the second functional program when calling the second functional program fails at a time of activating the first functional program, and
- repeating calling of the second functional program while the second functional program is being activated until activation of the second functional program is complete and the calling succeeds;
- activating the second functional program needed by the first functional program upon reception of the activation request; and
- activating an inactivated functional program among the functional programs when informed of completion of the activation of the first functional program that realizes the function of the preference mode, upon completion of the activation of the second functional program and upon response by the second functional program to calling by the first functional program.

8. A computer-readable recording medium that stores therein a computer program that activates a basic program and a plurality of functional programs that realize various functions upon power-on, wherein the computer program causes a computer to execute:
- activating only the basic program;
- inquiring the basic program of a described preference mode;
- activating a first functional program that realizes a function of the preference mode when informed of the preference mode;
- reading and interpreting a dependency relationship about the first functional program when activating the first functional program;
- calling a second functional program when there is a second functional program on which the first functional program depends according to the dependency relationship read;
- requesting activation of the second functional program when calling the second functional program fails, and repeating calling of the second functional program while the second functional program is being activated until activation of the second functional program is complete and the calling succeeds;
- activating a second functional program when there is a second functional program on which the first functional program depends according to the dependency relationship read; and
- activating an inactivated functional program among the functional programs when informed of completion of the activation of the first functional program that realizes the function of the preference mode.

* * * * *